(12) United States Patent
Iltsenko et al.

(10) Patent No.: US 11,807,949 B2
(45) Date of Patent: Nov. 7, 2023

(54) ELECTROLYSER FOR PRODUCTION OF CATHOLYTE

(71) Applicant: Valeri Iltsenko, Viimsi (EE)

(72) Inventors: Valeri Iltsenko, Viimsi (EE); Nikolay Nayda, Tallinn (EE)

( * ) Notice: Subject to any disclaimer, the term of this patent is extended or adjusted under 35 U.S.C. 154(b) by 0 days.

(21) Appl. No.: 17/851,730

(22) Filed: Jun. 28, 2022

(65) Prior Publication Data
US 2023/0015817 A1 Jan. 19, 2023

(30) Foreign Application Priority Data

Jun. 30, 2021 (EE) .................. P202100019

(51) Int. Cl.
*C25B 9/015* (2021.01)
*C25B 9/19* (2021.01)

(52) U.S. Cl.
CPC ............ *C25B 9/015* (2021.01); *C25B 9/19* (2021.01)

(58) Field of Classification Search
None
See application file for complete search history.

(56) References Cited

U.S. PATENT DOCUMENTS

| 2008/0264781 A1* | 10/2008 | Iltsenko | C02F 1/46109 204/253 |
|---|---|---|---|
| 2014/0029116 A1 | 1/2014 | Tsai et al. | |
| 2014/0367247 A1 | 12/2014 | Croke | |

FOREIGN PATENT DOCUMENTS

| CN | 104176793 A | 12/2014 |
|---|---|---|
| JP | 2013028822 A | 2/2013 |
| RU | 2040477 C1 | 7/1995 |
| RU | 2208589 C2 | 7/2003 |
| RU | 2297980 C1 | 4/2007 |
| RU | 2350692 C1 | 3/2009 |
| WO | 9858880 A1 | 12/1998 |

OTHER PUBLICATIONS

Estonian Patent Application No. P202100019, Search Report, dated Apr. 29, 2022, 2 pages.

\* cited by examiner

*Primary Examiner* — Wojciech Haske
(74) *Attorney, Agent, or Firm* — Meunier Carlin & Curfman LLC

(57) ABSTRACT

Electrolyzer for catholyte production comprises an inner hollow cylindrical anode, an outer cylindrical cathode, and a diaphragm interposed between them. The length of the working part of the anode is at most 2 to 6 times the outer diameter of the anode. The inner hollow anode is made of one or two sections, the sections being connected to each other by a flow dielectric cylindrical sleeve having a diameter not larger than the outer diameter of the anode. The inner hollow anode has openings for introduction of water into inner cavity of the anode and openings for discharge of water at opposite ends of diameters of the anode lid. The electrolyzer for catholyte production operates in a horizontal position because outlet openings of the anode lid are located at the ends of the diameter of the anode lid, close to the outlet openings of the electrolyzer lid facing vertically upwards.

6 Claims, 2 Drawing Sheets

ELECTROLYSER FOR PRODUCTION OF CATHOLYTE

PRIORITY

This application claims priority of the Estonian patent application number P202100019 filed on Jun. 30, 2021.

TECHNICAL FIELD

The invention relates to the field of chemical technology, in particular to devices for the treatment of electrolyte solutions and is intended mainly for the production of a catholyte, which is used as a detergent, as an extractant, and as a biologically active substance.

BACKGROUND

The use of catholyte is currently increasing, especially for washing technological equipment in the food industry, but existing electrolyzers are intended for the production of anolyte; catholyte is a by-product, has a small production volume with one electrolyzer, and the proportion of catholyte produced by this electrolyzer in the total volume of catholyte and anolyte is small, for example at a concentration of 6000 ppm NaOH in the catholyte the proportion of catholyte in the analogs is less than 20%.

A device RU2040477 for disinfecting and purifying water is known, in which the water is treated sequentially, first in the anode chamber, then in the cathode chamber, as a result of which 100% of the substance having only some signs of a catholyte leaves the device. The disadvantage of this electrolyzer is that the catholyte does not have high values in terms of pH and ORP because the cathode chamber does not process the neutral electrolyte but the acid anolyte with a pH of 2.5-3 and an ORP of up to +1100, resulting in a catholyte pH of only −7.5 and ORP+100 mV, with technologically required values of pH>11 and ORP<−800 mV.

A device RU2297980 for the electro activation of aqueous solutions is known; the disadvantage of this device is that the proportion of catholyte in the total volume of catholyte and anolyte is low and is 42-48.5%.

The proportion of catholyte in the known devices for obtaining disinfectant solutions (RU2208589, US2014/029116) is even lower, 5% to 11%, and is normal for said electrolyzers since catholyte is a by-product in these analogs.

A device JP2013028822 for obtaining a catholyte is known, in which gas bubbles are removed from the electrolyte to obtain a result. The disadvantage of this solution is that the proportion of catholyte is small and accounts for about 50% of the sum of the volumes of catholyte and anolyte.

A device CN104176793 for the production of catholyte with a high NaOH content is known, which uses an electrolyte circulation in an anode chamber where an external pump cools the circulating anolyte in a collection tank. The disadvantage of this device is the complexity of the device, as it is necessary to manufacture an external cooling system with a tank.

The closest analog is the electrolyzer RU2350692, having the same essential characteristics as the disclosed electrolyzer, so its inner electrode is an anode, made of a tubular blank and having an internal hollow, which is closed on both sides by a lid, the lids having openings for the entry and exit of water. The disadvantage of the RU2350692 electrolyzer is its low productivity—the total volume of catholyte and anolyte is about 40 liters per hour, and the volume of NaOH in catholyte is about 10 grams per hour because the productivity of this electrolyzer is limited by a predetermined ratio between the length of the operating part of the anode chamber and the diameter of the anode, the length of the operating part of the anode chamber being 15 to 25 times the diameter of the anode. Since the production of a catholyte with NaOH, even in small quantities of 80 grams per hour, requires an electric current of about 100 amps, which requires an anode surface area of at least 4 square decimetres, that is, for an anode diameter of 22 to 24 mm, its length must be 580 to 530 mm to meet the specified ratio, the corresponding ceramic diaphragm must be about 30 mm in diameter and the length about 60 mm, which is currently difficult to fill. Another disadvantage of this electrolyzer is the slow filling of the anode chamber by filtration of the electrolyte through the diaphragm wall due to the elevated pressure in the cathode chamber. Furthermore, the design of this electrolyzer does not provide for use in a horizontal position because the inlet and outlet openings of the inner electrode lids are centered, which in the horizontal position of the electrolyzer creates gas bubbles in the inner electrode hollow and thus impairs the cooling of the inner electrode.

SUMMARY OF THE INVENTION

The objects of the present invention are to increase the productivity of the electrolyzer relative to the catholyte in terms of NaOH to 1200 grams per hour; the proportion of catholyte in the total volume of both catholyte and anolyte must be more than 92.0% for NaOH concentrations in the catholyte up to 1000 ppm and NaOH concentrations more than 70.0% up to 6000 ppm and create a possibility to allow the use of an electrolyzer in a horizontal position. The constraints—the technical capabilities of the machines for the production of diaphragms and the dimensions of the furnaces to form an active coating on the anode—that affect the catholyte outputs were taken into account in the solution of the tasks. Due to technical availability and economic feasibility, the authors used in practice anodes or sections thereof up to 580 mm with a diameter up to 219 mm and a diaphragm and parts thereof up to 1000 mm in length, with a diameter up to 235 mm.

The task set is solved due to the fact that in the disclosed electrolyzer, there are differences: the length of the working part of the chamber, i.e., the length of the working part of the anode chamber, is 2-6 times larger than the outer diameter of the anode contrary to 15-25 times in analogue electrolyzers; in addition, the construction of the anode provides for the possibility of extending the anode if two sections are used to mount it by connecting them by means of a sleeve where the outer diameter of the sleeve is smaller than the outer diameter of the anode; the electrolyzer lid has an opening for entering the anode chamber to fill the anode chamber with electrolyte from the outside; the inlets and outlets of the inner electrode in the opposite inner electrode lids are arranged at opposite ends of the diameters of the lids.

There is a cause and effect relationship between the set of essential characteristics of the electrolyzer presented, and the result obtained, namely:

In order to achieve electrolyzer productivity of more than 1200 grams of NaOH per hour in the catholyte from the electrolyte in the form of NaCl or NaHCO3 solution, the ratio between the length of the working part of the anode chamber and the diameter of the anode is reduced but also extended by the anode sleeve connecting the anode sections. In order to synthesize 1200 grams of NaOH per hour, it is sufficient to use an electric current of 1550 amps, the working surface of the anode must be 62 square decimetres in order to withstand the work of this active coating, however, the length of the working part of the anode (and anode chamber) for its diameter of 219 mm must in practice be 902 mm, i.e., that the length of the operating part of the anode chamber is 4.1 times the diameter of the anode, wherein the overall anode length with terminals is 1150 mm, obtained by connecting two anode sections, each 575 mm long, by means of a sleeve.

In order to increase the proportion of catholyte in the total volume of catholyte and anolyte, the volume of anolyte produced is reduced to an amount that is still capable of dissolving all the active chlorine ions to prevent the formation of chlorine gas in the anode chamber, wherein the heating of the anolyte and catholyte does not exceed 30 degrees. An electric current of 1550 amps synthesizes about 1550 grams of active chlorine per hour from the NaCL or NaCO3 electrolyte, and 50 liters of water per hour are sufficient to dissolve it, but for safety, 80 liters of water per hour pass through the opening of the electrolyzer lid into the anode chamber. 1200 grams per hour of NaOH at a concentration of 1000 ppm contains 1200 liters per hour of catholyte, but at a concentration of 6000 ppm contains 200 liters per hour of catholyte. The ratio of catholyte to total catholyte to anolyte volume is 93.75% in the first case and 71.4% in the second case. The heating of the catholyte and anolyte is about 4.4 degrees in the first case and about 28.3 degrees in the second case.

Electrolyser in an operating condition in a horizontal position, without the heating of the catholyte and anolyte increasing, is provided by placing the electrolyte anode outlet at the end of the anode lid diameter closest to the outlet on the lid of the electrolyte and is directed vertically upwards to allow full filling of the inner anode hollow with water without gas bubbles and efficient cooling of the electrolyte in the anode chamber.

The invention makes it possible to produce high technical concentrations of NaOH, pH, and ORP in industrial quantities of the catholyte, significantly reducing the use of water to produce the accompanying anolyte while, depending on the technical conditions, placing the electrolyzers in the device both vertically and horizontally.

BRIEF DESCRIPTION OF THE FIGURES

The technical nature and operation of the device are explained in the drawings, where.

DETAILED DESCRIPTION OF THE INVENTION

Figure 3:
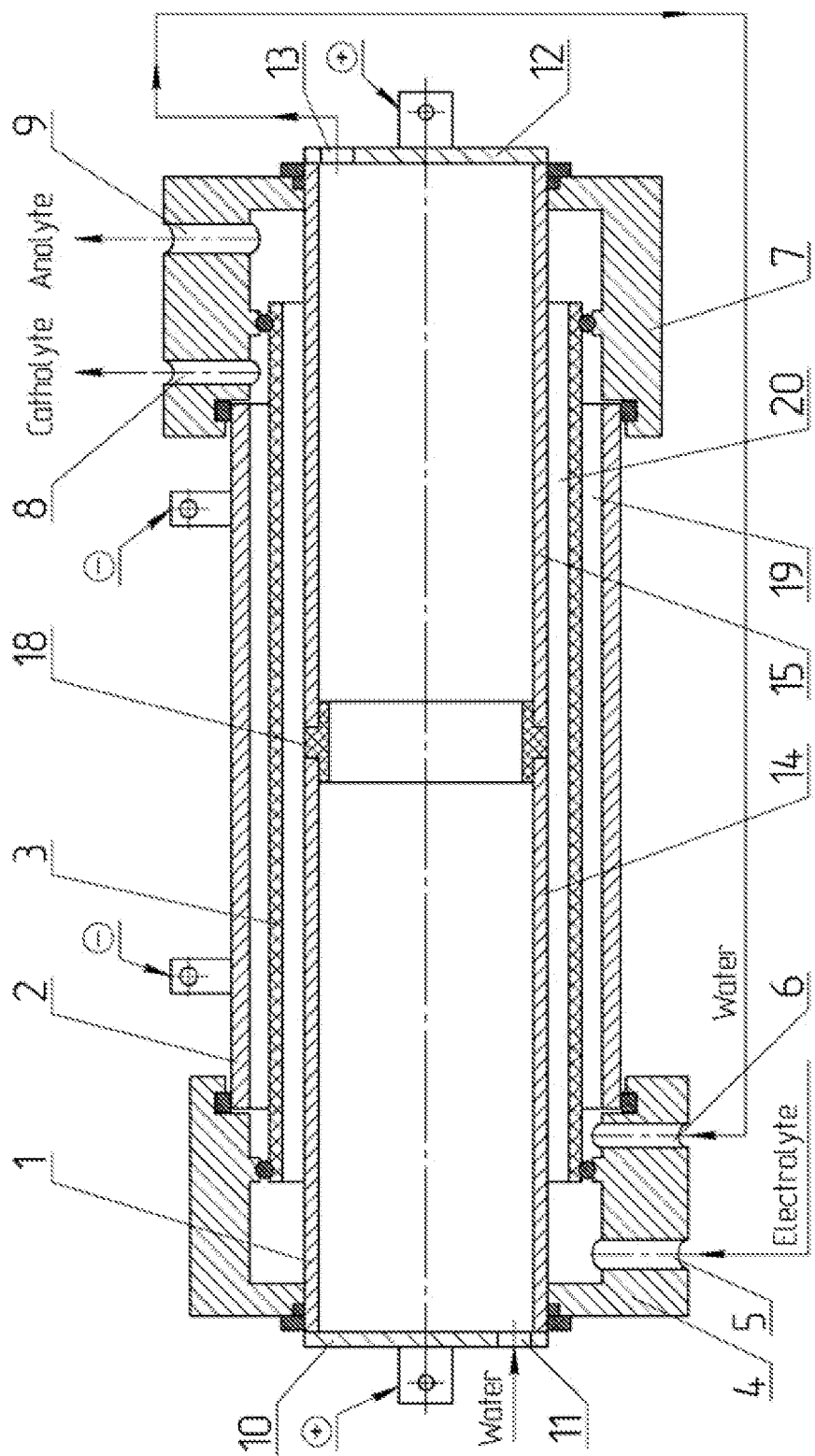
FIG. 3 shows the electrolyzer in a horizontal position.

An embodiment of the present invention is exemplified in the results table for various types of electrolyzers for the production of catholyte prepared in accordance with the present application. The operating results of the electrolyzer for the production of catholyte confirm the productivity achieved in terms of conversion to NaOH (in the table electrolyzer CG-3400ANE, two-compartment), achieving the declared catholyte content in the total catholyte and anolyte volume (columns 6 and 7 in the table), applying in the electrolyzer design a ratio between the length of the operating part of the anode chamber and the diameter of the anode between 2.0 and 5.5 (column 4). The construction of the electrolyzer for the production of catholyte is shown in FIG. 3.

| Name of the electrolyzer | Anode diameter | Length of the working part of the anode chamber in | The ratio between length and diameter | NaOH productivity | The proportion of catholyte in the total volume of catholyte and anolyte | |
|---|---|---|---|---|---|---|
| | mm | mm | | g/hour | 1000 ppm | 6000 ppm |
| 1 | 2 | 3 | 4 | 5 | 6 | 7 |
| CG-40ANE | 38 | 98 | 2.6 | 17 | 94.4 | 75.0 |
| CG-600ANE | 86 | 450 | 5.2 | 230 | 93.8 | 71.7 |
| CG-1700ANE | 219 | 450 | 2.1 | 500 | 94.0 | 72.4 |
| CG-3400ANE (with two sections) | 219 | 940 | 4.3 | 1250 | 94.6 | 74.8 |

The disclosed cylindrical diaphragm flow electrolyzer comprises a cylindrical anode 1, a cathode 2, and a diaphragm 3. The electrolyzer has a lid 4 with openings 5 and 6 for the entry of the electrolyte and a lid 7 with openings 8 and 9 for the exit of the electrolyte.

Figure 1:
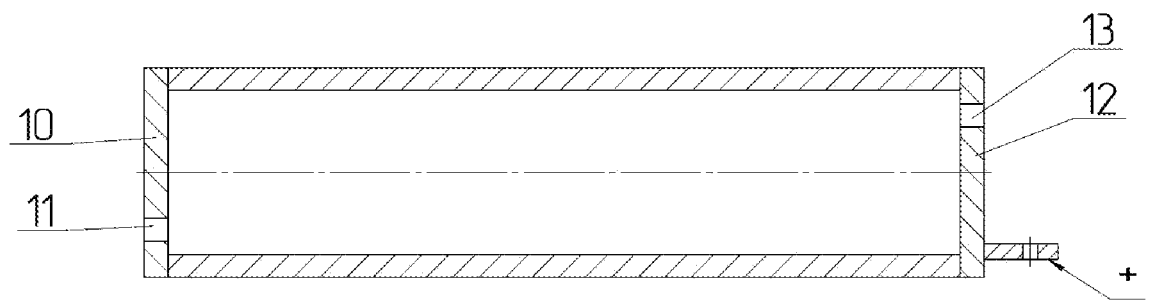
FIG. 1 is a one-section anode closed at one end by a lid having an opening for water to enter the inner hollow of the anode and at the other end closed by a lid having an opening for water leaving the inner hollow of the anode.

The one-section anode (FIG. 1) has a lid 10 for opening water with an opening 11, where the opening 11 is located at the end of the lid diameter, and a similar opening 13 with a lid 12 for the water outlet, where the opening 13 is located at the opposite end of the lid diameter. The anode has a terminal marked (+) in the figure.

Figure 2:
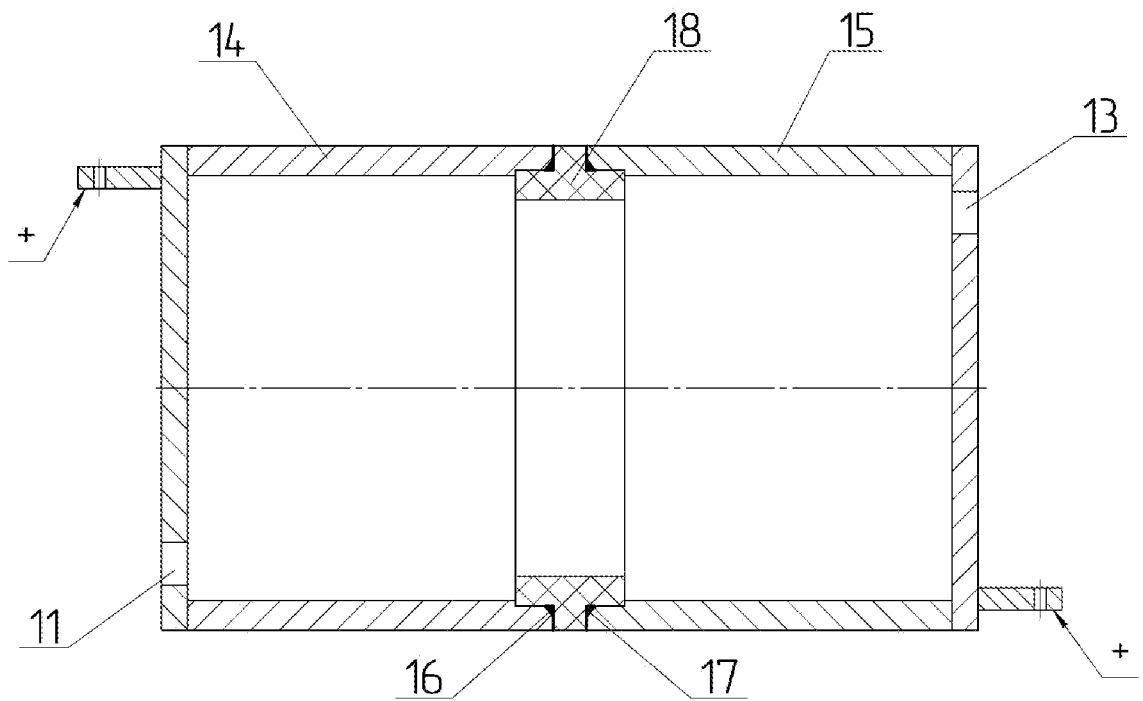
FIG. 2 shows a two-section anode, wherein each anode section has a lid at one end with an opening at the end of the diameter of the lid; at the other end of the section, there is a thread for connection to the sleeve and a conical plane for hydraulic sealing of the connection between the section and the sleeve, wherein the two sections of the anode are connected in such a way that the opening for entering the inner hollow of the anode and the opening for leaving it are located at opposite ends of the diameters.

The two-section anode (FIG. 2) consists of two identical sections, 14 and 15; each section has a lid with an opening at one end, and at the other end of the section, there is a thread 16 for connecting the sections by means of a sleeve 18 and a conical plane 17 for hydraulically sealing the connection between the sections and the sleeve, wherein the sections are connected in such a way that the openings 11 and 13 of the anode cover are arranged at opposite ends of the diameter of the anode cover. Each anode section has terminals marked (+) in the figure. The connecting sleeve 18 is made of electrically insulating material.

The interior of the assembled electrolyzer (FIG. 3) has a cathode chamber 19 between the cathode 2 and the diaphragm 3 from the opening 6 to the opening 8, and the interior of the electrolyzer has an anode chamber 20 between the anode 1 and the diaphragm 3 from the opening 5 to the opening 9. The part of the anode chamber 20, which is arranged against the cathode 2, is called the operating part of the anode chamber. The part of the anode 1 which is placed against the cathode 2 is called the working part of the anode.

The electrolyzer for the production of catholyte described above works as follows: freshwater is introduced into the inner hollow of the anode 1 through an opening 11 in the anode lid 10, intended for the injection of water, the water cools the anode 1, the water is discharged from the inner hollow of the anode through the opening 13 of the lid 12 and directed to the opening 6 of the electrolyzer lid 4, where the water enters the cathode chamber 19 wherein the water is electrochemically converted to a catholyte, and the catholyte is discharged through the opening 8 in the lid 7. In order to change the properties of the catholyte and the accompanying anolyte, NaCl, NaHCO3, and the like are taken into the cathode chamber. Simultaneously with the introduction of freshwater into the inner hollow of the anode 1, an electrolyte is introduced into the anode chamber 20 through the opening 5 of the lid 4 (depending on the production conditions, it may be NaCl, NaHCO3) in the anode chamber, the electrolyte is converted to an anolyte, and the anolyte is led out of the electrolyzer through the opening 9 in the lid 7. After the anode chamber and the cathode chamber have been filled, a constant voltage is applied to the anode and the cathode via the (+) and (−) terminals.

The invention claimed is:

1. An electrolyzer for catholyte production comprising an inner hollow cylindrical anode, an outer cylindrical cathode, and a diaphragm mounted between the anode and the cathode, wherein a length of a working part of the anode is two to six times greater than a diameter of the inner hollow cylindrical anode and wherein the electrolyzer has an anode lid at each end, and each lid has an opening at an end of a diameter of the lid, one of the openings being a water outlet opening and another being a water inlet opening, and wherein the electrolyzer is configured to operate in a horizontal position by arranging the anode lids such that the water outlet opening is close to an upward facing exit opening of the electrolyzer.

2. The electrolyzer for catholyte production according to claim 1, wherein the inner hollow anode is made of one or two sections.

3. The electrolyzer for catholyte production according to claim 2, wherein the inner hollow anode is made of two sections, and the sections are connected to each other by a flow-through, dielectric, cylindrical sleeve having an outer diameter not larger than the outer diameter of the anode.

4. An electrolyzer for catholyte production comprising an inner hollow cylindrical anode, an outer cylindrical cathode, and a diaphragm mounted between the anode and the cathode, wherein a length of a working part of the anode is two to six times greater than a diameter of the inner hollow cylindrical anode, and wherein the inner hollow anode is made of two sections and the sections are connected to each other by a flow-through dielectric, cylindrical sleeve having an outer diameter not larger than the outer diameter of the anode.

5. The electrolyzer according to claim 4, wherein the electrolyzer has an anode lid at each end, and each lid has an opening at an end of a diameter of the lid, one of the openings being a water outlet opening and another being a water inlet opening.

6. The electrolyzer according to claim 5, wherein the electrolyzer is configured to operate in a horizontal position by arranging the anode lids such that the water outlet opening is close to an upward facing exit opening of the electrolyzer.

* * * * *